Figure 1:
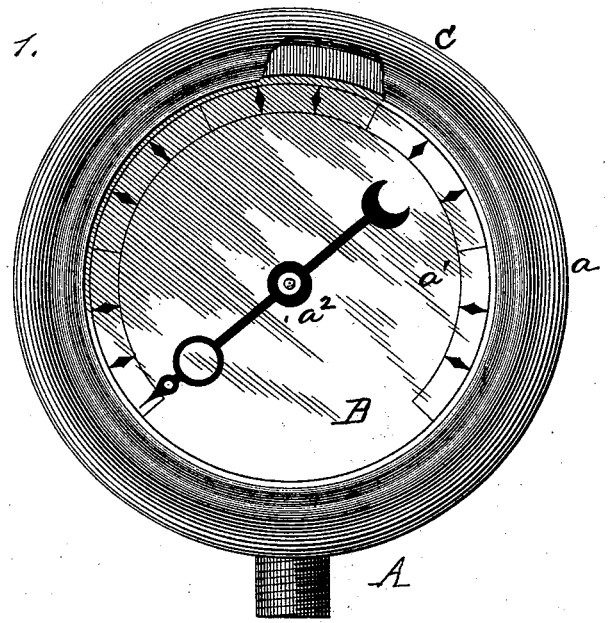

(No Model.)

C. B. BOSWORTH.
GAGE.

No. 522,551. Patented July 3, 1894.

Witnesses:

Inventor:
Charles B. Bosworth.
By W. H. Singleton,
Atty.

UNITED STATES PATENT OFFICE.

CHARLES B. BOSWORTH, OF EVERETT, MASSACHUSETTS.

GAGE.

SPECIFICATION forming part of Letters Patent No. 522,551, dated July 3, 1894.

Application filed February 24, 1894. Serial No. 501,415. (No model.)

*To all whom it may concern:*

Be it known that I, CHARLES BARTLETT BOSWORTH, a citizen of the United States, residing at Everett, in the county of Middlesex and State of Massachusetts, have invented certain new and useful Improvements in Gages; and I do hereby declare the following to be a full, clear, and exact description of the invention, such as will enable others skilled in the art to which it appertains to make and use the same.

About twenty years ago, steam gages made with an iron case having the glass dial resting upon its edge and held in place by a spun ring pressed down over the case came into use. The iron gage case was oftentimes of such degree of hardness that in facing off its edge upon which rested the glass, there would be spots upon it which would not be removed by the tool, thus leaving little protuberances thereon. Even the gage cases themselves were used as they were cast, having the same edge not all in the same plane, there being little irregularities of the casting or of the Japan paint with which they were colored. These defects of this edge caused great destruction to the glass disk which was placed upon it on account of the pressure put upon it by the ring when urged to take its place upon the gage case. It came about by the bending of the glass over a little protuberance that it was at once broken or became so after some time, due to the continuous strain to which it was subjected. Sometimes the glass disks themselves were irregular in shape, not being wholly flat, so that, when placed upon the edge of the case, they did not find a bearing around their outer edge in all parts. In such case the glass, subjected to the pressure of the ring when pushed down upon the case, being unyielding would break. Oftentimes again the glasses, resisting the pressure for some time, would be destroyed by the change of temperature, due to the expansion and contraction of the materials of which the gage was composed, as, for example, when assembled and completed in a warm room, afterward being placed in a stock room or in use where the temperature was very much lower, there would be a cracking and breaking of the glasses. These conditions have been a serious drawback in the manufacture of this class of gages; and it may here be said that this class of gages comprises the greatest number of all manufactured and in use in this country. All manufacturers have suffered seriously from them and have endeavored in many ways to overcome them, but, with the exception of the device which is hereinafter set out, no remedy has ever been known. The company, with which I am connected, suffered like all other makers of gages in this respect, and more largely from the magnitude of the number which it has produced. It had been a long time engaged down to the moment when the present device was discovered in trying to find some way to obviate the trouble, but had wholly failed.

It was after many complaints of broken glass disks that I suggested that a trial be made of surrounding the glass disk with a rubber band, thus forming a cushion between the glass and the edge of the case upon which it rested to receive the unequal pressure, due to the irregularity of the edge of the case upon which it rested when the ring was forced to its place upon it. The experiment was tried by me and, when the discovery was made that it was impossible to break the glass disk when so surrounded by or embedded in the elastic cushion, it happened that the first gage case taken for the experiment was one upon the edge of which was a hard lump of metal projecting perhaps about one sixty fourth of an inch. Placing upon this edge a glass disk and forcing a ring upon it by the hands, I was able to break every glass that was so tried, shattering it just where the glass rested upon this lump. As soon as a glass disk was surrounded by this elastic rubber band and placed upon the gage case, no pressure by the hand, or otherwise, upon the ring was able in any way to shatter it. The difficulty was removed. It appeared upon examination that the elastic cushion had received the lump of metal within it, and, indeed, whatever irregularities of surface there were, whether upon the glass disk or upon the edge of the case, they were wholly within this cushion, making a true and even bearing between the glass and the edge of the case. Immediately the discovery was put into use and has been applied successfully to thousands and thousands of gages that have been made. One and the chief reason that heretofore there was no practical solution of the difficulty was inability to find some substance which could rest upon the edge of the case between it and the glass, specially adapted to the purposes desired. Of course, it was well known that there must be a cushion of some kind between the glass and the edge of the case, but how this cushion could be applied was the difficulty; felt rings, rubber gaskets, devices of various fabrics have been tried, but the expense of producing them and of placing them upon the edge of the case, holding them there while the glass could be put on and keeping them there afterward, have rendered useless every means heretofore applied or conceived of.

The snapping of a rubber band around the glass disk is so simple and inexpensive that, as soon as it is done, nothing further needs to be performed to complete the operation for preserving the glass disk when resting in its place upon the edge of the gage case. No cement, no special form, or anything else, is required to do the work. The common rubber band of commerce drawn around the edge of the glass is all that is needed. Cheapness, simplicity and absolute security are thus obtained. This process is spoken of in detail simply because of the difficulties that before its conception existed in trying to find some way to do it, and none appeared except those of a costly nature, both to produce and apply, and then with no certainty that they would endure after the gage went into use.

The present invention, therefore, consists in a gage provided with a securing ring; a glass; and an elastic fabric in which the edge of the glass is embedded, such elastic fabric being on both faces of the glass at its edge and between one face of the glass at its edge and the ring and between the other face of the glass at its edge and the gage case, all as fully explained.

Figure 2:
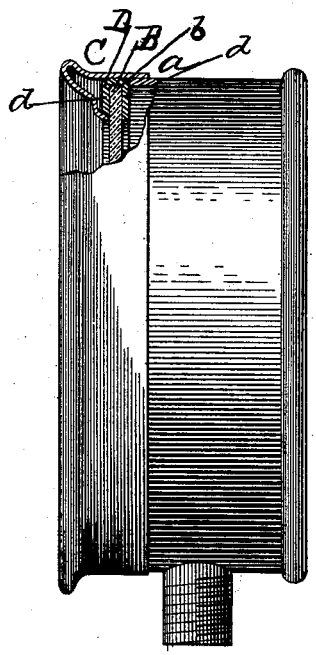

In the drawings: Figure 1 is a face view of a gage, part being broken away. Fig. 2 is a diametric section.

In the annexed drawings: the letter A indicates a gage having the case, $a$, for the operative parts with the dial, $a'$, and the index finger, $a^2$. Against the edge of the case, $a$, the glass cover, B, is placed and the securing ring, C, is placed over it. All this is as usual. Around the edge, $b$, of the glass cover, B, is sprung a rubber band, D, so that the edges, $d\ d$, of this band come one on each side of the glass cover, B. Hence the edge of the glass cover, B, is embedded in the rubber ring. This rubber ring forms an elastic seat for the edge of the glass and comes between the edge and the case, $a$, and securing ring, C. This rubber readily accommodates itself to any inequalities in the surfaces of the glass, the case and the securing ring, and prevents the pressure from breaking the glass when the parts are assembled or from variations in temperature, as the rubber readily yields, as has been fully explained.

I am aware that rubber rings for packings are old and have been used to form air-tight and other kinds of joints, and I do not claim such broadly.

I have been made aware of United States Patent No. 103,287 for improvement in compasses wherein is shown a compass, there being a packing between the edge of the glass and the case. Such packing, however, is only at the edge of the glass where the glass rests against the case.

In the present device, as has been fully explained, the elastic fabric not only is between the edge of the glass and the case, but it is between the face of the glass at the edge thereof and the case.

Having thus described my invention, what I claim is—

1. A gage provided with a securing ring; a glass and an elastic fabric in which the edge of the glass is embedded, the elastic fabric being on both faces of the glass at its edge and between one face of the glass at its edge and the ring and between the other face of the glass at its edge and the gage case.

2. The combination of the case, $a$; the ring, C; the glass, B, between them; and the elastic fabric, D, in which the edge of the glass is embedded, such fabric being between the ring and one face of the glass at its edge and between the case and the other face of the glass at its edge and between the edge of the glass and the case, as set forth.

In testimony whereof I affix my signature in presence of two witnesses.

CHARLES B. BOSWORTH.

Witnesses:
JOSHUA H. MILLETT,
ARTHUR L. BOWKER.